US012719002B2

(12) United States Patent
Dai et al.

(10) Patent No.: US 12,719,002 B2
(45) Date of Patent: Aug. 25, 2026

(54) MAGNETIC LATCHING RELAY

(71) Applicant: Xiamen Hongfa Electric Power Controls Co., Ltd., Xiamen (CN)

(72) Inventors: Wenguang Dai, Xiamen (CN); Guojin Liao, Xiamen (CN); Qingyang Huang, Xiamen (CN); Zhongbo He, Xiamen (CN); Fangneng Li, Xiamen (CN)

(73) Assignee: Xiamen Hongfa Electric Power Controls Co., Ltd., Xiamen (CN)

(*) Notice: Subject to any disclaimer, the term of this patent is extended or adjusted under 35 U.S.C. 154(b) by 182 days.

(21) Appl. No.: 18/666,360

(22) Filed: May 16, 2024

(65) Prior Publication Data

US 2024/0387130 A1 Nov. 21, 2024

(30) Foreign Application Priority Data

May 18, 2023 (CN) ........................ 202321210069.8

(51) Int. Cl.
*H01H 50/04* (2006.01)
*H01H 50/36* (2006.01)

(52) U.S. Cl.
CPC ........ *H01H 50/041* (2013.01); *H01H 50/047* (2013.01); *H01H 50/36* (2013.01)

(58) Field of Classification Search
None
See application file for complete search history.

(56) References Cited

U.S. PATENT DOCUMENTS

| | | | |
|---|---|---|---|
| 3,163,738 A | 12/1964 | Farrell | |
| 4,323,945 A | 4/1982 | Sauer | |
| 4,625,191 A | 11/1986 | Oberndorfer et al. | |
| 6,426,689 B1 * | 7/2002 | Nakagawa ......... | H01H 51/2272 335/78 |
| 6,475,019 B1 | 11/2002 | Zielke et al. | |

(Continued)

FOREIGN PATENT DOCUMENTS

| | | |
|---|---|---|
| CN | 204596720 U | 8/2015 |
| CN | 106971912 A | 7/2017 |

(Continued)

OTHER PUBLICATIONS

Extended European Search Report for EP Patent Application No. 24176368.9 of Oct. 4, 2024.

(Continued)

*Primary Examiner* — Bernard Rojas
(74) *Attorney, Agent, or Firm* — Perilla Knox & Hildebrandt; Kenneth A. Knox

(57) ABSTRACT

A magnetic latching relay includes a base having a receiving chamber with a first sidewall extending in a longitudinal direction and a second sidewall extending in a transverse direction, and connected with the first sidewall; a coil assembly in the receiving chamber in the transverse direction and having a first end adjacent to the first sidewall; and a fixing frame on the base. The fixing frame has a first side close to the coil assembly, and is in sealed contact with the first end of the coil assembly, and a side of the fixing frame facing the first sidewall is in sealed contact with the first sidewall, forming a first glue dispensing port surrounded by the first sidewall, the second sidewall, the first end of the coil assembly, and the fixing frame.

18 Claims, 7 Drawing Sheets

(56) References Cited

U.S. PATENT DOCUMENTS

| | | | | |
|---|---|---|---|---|
| 8,203,403 | B2 * | 6/2012 | Moeller | H01H 51/2227 335/78 |
| 8,222,981 | B1 * | 7/2012 | Zarbock | H01H 51/2272 335/121 |
| 2002/0135446 | A1 | 9/2002 | Takano et al. | |
| 2003/0073339 | A1 | 4/2003 | Zielke et al. | |
| 2008/0231397 | A1 | 9/2008 | Katou | |
| 2009/0033446 | A1 | 2/2009 | Gruner et al. | |
| 2009/0033447 | A1 | 2/2009 | Gruner et al. | |
| 2016/0284498 | A1 | 9/2016 | Zhang et al. | |
| 2018/0240631 | A1 * | 8/2018 | Hayashida | H01H 50/641 |
| 2019/0013172 | A1 | 1/2019 | Hayashida et al. | |
| 2021/0407754 | A1 | 12/2021 | Kitajima et al. | |
| 2022/0392725 | A1 | 12/2022 | Wei | |
| 2024/0387137 | A1 | 11/2024 | Dai et al. | |

FOREIGN PATENT DOCUMENTS

| | | | | |
|---|---|---|---|---|
| CN | 106971913 | A | 7/2017 | |
| CN | 206877912 | U | 1/2018 | |
| CN | 206877914 | U | 1/2018 | |
| CN | 206877922 | U | 1/2018 | |
| CN | 208225812 | U | 12/2018 | |
| CN | 208903935 | U | 5/2019 | |
| CN | 209708908 | U | 11/2019 | |
| CN | 212542290 | U | 2/2021 | |
| CN | 213519779 | U | 6/2021 | |
| CN | 214068646 | U | 8/2021 | |
| CN | 216902697 | U | 7/2022 | |
| CN | 115631974 | A | 1/2023 | |
| CN | 219873356 | U | 10/2023 | |
| CN | 220041714 | U | 11/2023 | |
| CN | 220041735 | U | 11/2023 | |
| CN | 117727602 | A | 3/2024 | |
| CN | 118136454 | A * | 6/2024 | H01H 50/02 |
| DE | 112015006404 | T5 | 12/2017 | |
| EP | 1843377 | A1 | 10/2007 | |
| EP | 1843377 | B1 | 3/2009 | |
| EP | 2822011 | A1 | 1/2015 | |
| EP | 2827354 | A1 | 1/2015 | |
| EP | 2551868 | B1 | 2/2015 | |
| EP | 3608938 | A1 | 2/2020 | |
| EP | 3608938 | B1 | 3/2022 | |
| EP | 4354479 | A1 | 4/2024 | |
| JP | S50158162 | U | 12/1975 | |
| JP | S57113532 | A | 7/1982 | |
| JP | H01220323 | A | 9/1989 | |
| JP | 2006059702 | A | 3/2006 | |
| JP | 2013030310 | A | 2/2013 | |
| JP | 2014505345 | A | 2/2014 | |
| JP | 2015060748 | A | 3/2015 | |
| JP | 2015127996 | A | 7/2015 | |
| JP | 2025127996 | A | 7/2015 | |
| JP | 5773006 | B1 | 9/2015 | |
| JP | 5930094 | B1 | 6/2016 | |
| JP | 2016194984 | A | 11/2016 | |
| JP | 2019032945 | A | 2/2019 | |
| KR | 20140138591 | A | 12/2014 | |
| KR | 20240166941 | A | 11/2024 | |
| WO | 2006006557 | A1 | 1/2006 | |
| WO | 2015125319 | A1 | 8/2015 | |
| WO | 2018177428 | A1 | 10/2018 | |
| WO | 2019026945 | A1 | 2/2019 | |
| WO | 2022127627 | A1 | 6/2022 | |
| WO | 2022262851 | A1 | 12/2022 | |

OTHER PUBLICATIONS

Extended European Search Report for EP Patent Application No. 24176392.9 of Oct. 15, 2024.

Extended European Search Report for EP Patent Application No. 24176665.8 of Oct. 15, 2024.

Extended European Search Report for EP Patent Application No. 24176390.3 of Oct. 4, 2024.

Notice of Allowance for EP Patent Application No. 24176368.9 of Jul. 17, 2025.

Notice of Allowance for JP Patent Application No. 2024-081166 of Oct. 7, 2025.

Notice of Allowance for KR Patent Application No. 20-2024-0000880 of Jul. 25, 2025.

First Office Action for CN Patent Application No. 202310565273X of Aug. 30, 2025.

First Office Action for CN Patent Application No. 2023105682754 of Jul. 25, 2025.

First Office Action for CN Patent Application No. 2023105682843 of Aug. 1, 2025.

First Office Action for JP Patent Application No. 2024-081166 of Apr. 30, 2025.

First Office Action for JP Patent Application No. 2024-081279 of Jun. 17, 2025.

First Office Action for JP Patent Application No. 2024-081318 of Jun. 24, 2025.

Second Office Action for JP Patent Application No. 2024-081279 of Nov. 18, 2025.

Second Office Action for CN Patent Application No. 2023105682843 of May 1, 2026.

Notice of Allowance for KR Patent Application No. 10-2024-0064770 of Mar. 13, 2026.

Notice of Allowance for U.S. Appl. No. 18/668,126 of Jun. 22, 2026.

* cited by examiner

MAGNETIC LATCHING RELAY

CROSS REFERENCE TO RELATED APPLICATION

This application is based upon, claims the benefit of, and claims priority to Chinese Patent Application No. 202321210069.8, filed on May 18, 2023, where the entire contents thereof are incorporated by reference in their entirety herein.

TECHNICAL FIELD

The present disclosure relates to the field of relay technology and, particularly, to a magnetic latching relay.

BACKGROUND

A magnetic latching relay is an automatic switch that serves to connect and disconnect circuits. The magnetic latching relay includes a base and a coil assembly, a yoke, etc., which are arranged on the base and are combined with the base by dripping glue into a glue slot.

However, in the related technology, a slot opening of the glue slot is not a closed structure. During a dispensing of glue or in an oven curing process after said dispensing, the liquefied glue flows uncontrollably spills at the slot opening, which affects the glue dispensing effect and wastes glue.

The contents as disclosed in the Background portion are merely used to reinforce an understanding of the background technology of the present disclosure and, accordingly, the Background portion may include information that does not constitute the related art as already known by an ordinary person skilled in the art.

BRIEF SUMMARY

Embodiments of the present disclosure provide a magnetic latching relay, including a base, a coil assembly, and a fixing frame.

The base has a receiving chamber, the receiving chamber has a first sidewall extending in a longitudinal direction and a second sidewall extending in a transverse direction, and the first sidewall and the second sidewall are connected. The coil assembly is arranged in the receiving chamber in the transverse direction and has a first end adjacent to the first sidewall. The fixing frame is arranged on the base and located on a side of the coil assembly away from the second sidewall; the fixing frame has a first side close to the coil assembly in the longitudinal direction, the first side is in sealed contact with the first end of the coil assembly, and a side of the fixing frame facing the first sidewall is in sealed contact with the first sidewall, in this way, a first glue dispensing port surrounded by the first sidewall, the second sidewall, the first end of the coil assembly, and the fixing frame is formed.

In some embodiments of the present disclosure, the magnetic latching relay further includes a first mounting bracket arranged in the receiving chamber of the base and extending in the longitudinal direction, the first mounting bracket is spaced from the first sidewall, the first end of the coil assembly is arranged on the first mounting bracket, and one end of the first mounting bracket is in sealed connection with the second sidewall, in this way, a closed first glue dispensing port surrounded by the first sidewall, the second sidewall, the first mounting bracket, the first end of the coil assembly, and the fixing frame is formed.

In some embodiments of the present disclosure, a first protruding portion protruding towards the first sidewall is arranged on the side of the fixing frame facing the first sidewall, and the first protruding portion is in sealed contact with the first sidewall; a second protruding portion protruding towards the first end of the coil assembly is arranged on the first side of the fixing frame, and the second protruding portion is in sealed contact with the first end of the coil assembly and the other end of the first mounting bracket.

In some embodiments of the present disclosure, the first mounting bracket has a first arcuate support with an arcuate surface, the first end of the coil assembly is located on the arcuate surface, and one end of the first arcuate support is in sealed connection with the second sidewall.

In some embodiments of the present disclosure, the first mounting bracket further has a first limiting part that is in sealed connection with the other end of the first arcuate support and is spaced from the first sidewall.

In some embodiments of the present disclosure, the magnetic latching relay further includes a first yoke having a first yoke part and a second yoke part; the first yoke part and the second yoke part are connected in an L-shape; the first yoke part is arranged between the first end of the coil assembly and the first sidewall and is fixed to the first sidewall; the second yoke part faces the fixing frame, and the fixing frame includes a first longitudinal limiting part that clamps to the second yoke part in the longitudinal direction.

In some embodiments of the present disclosure, the coil assembly further includes a second end opposite to the first end; the receiving chamber further has a third sidewall extending in the longitudinal direction; the third sidewall is connected to the second sidewall and is arranged opposite to the first sidewall, the second end of the coil assembly is adjacent to the third sidewall, and the first side of the fixing frame is in sealed contact with the second end of the coil assembly.

In some embodiments of the present disclosure, a flange protruding towards the third sidewall is arranged on a top of the second end of the coil assembly, and the flange in sealed contact with the top of the third sidewall.

In some embodiments of the present disclosure, the fixing frame has a third protruding portion protruding towards the third sidewall, the third protruding portion in sealed contact with the third sidewall, in this way, a closed second glue dispensing port surrounded by the third sidewall, the second end of the coil assembly, and the fixing frame is formed.

In some embodiments of the present disclosure, a fourth protruding portion protruding towards the coil assembly is arranged on the first side of the fixing frame, and the fourth protruding portion is in sealed contact with the second end of the coil assembly.

In some embodiments of the present disclosure, the base also has a second mounting bracket extending in the longitudinal direction, the second mounting bracket is located in the receiving chamber and is spaced from the third sidewall, one end of the second mounting bracket is sealed connection with the second sidewall, and the second end of the coil assembly is arranged on the second mounting bracket.

In some embodiments of the present disclosure, the second mounting bracket has a second arcuate support with an arcuate surface, the second end of the coil assembly is located on the arcuate surface, and one end of the second arcuate support is in sealed connection with the second sidewall.

In some embodiments of the present disclosure, the magnetic latching relay further includes a second yoke having a third yoke part and a fourth yoke part, the third yoke part and the fourth yoke part are connected in an L-shape; the third yoke part is arranged between the second end of the coil assembly and the third sidewall and is fixed to the third sidewall; the fourth yoke part faces the fixing frame; the fixing frame includes a second longitudinal limiting part that clamps to the fourth yoke part in the longitudinal direction.

BRIEF DESCRIPTION OF THE DRAWINGS

The above-described and other features and advantages of the present disclosure will become more apparent from the detailed descriptions of exemplary embodiments with reference to the accompanying drawings.

Figure 1:
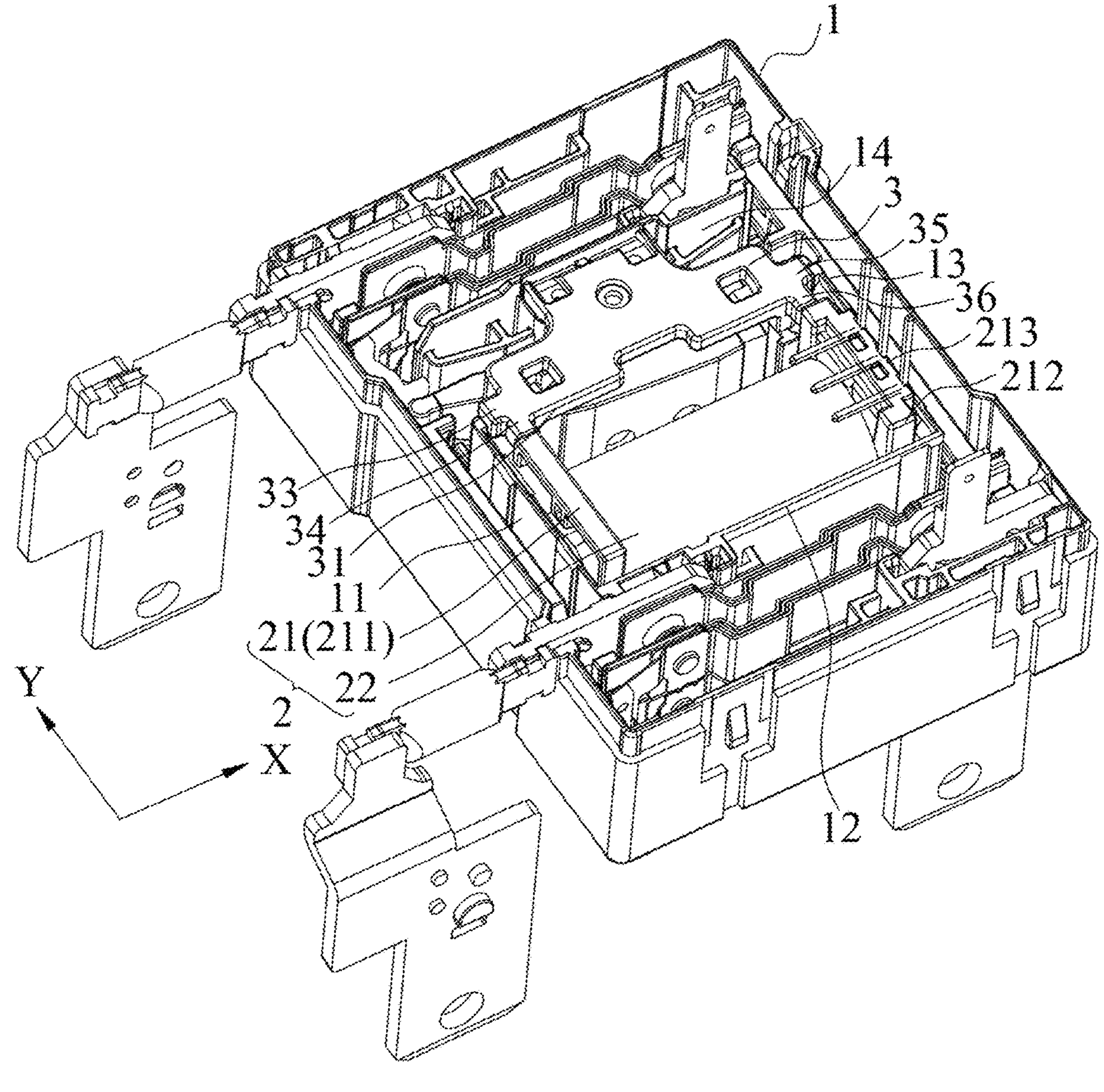
FIG. 1 is a perspective view of a magnetic latching relay according to some embodiments of the present disclosure.

The reference numbers are listed as follows:

1. base
11. first sidewall
111. first slot
12. second sidewall
13. third sidewall
131. second slot
14. fourth sidewall
141. mounting hole
15. first mounting bracket
151. first arcuate support
152. first limiting part
16. second mounting bracket
161. second arcuate support
162. second limiting part
2. coil assembly
21. bobbin
211. first flange
212. second flange
213. protruding edge
22. coil
201. first end
202. second end
3. fixing frame
21. first side
32. second side
33. first protruding portion
34. second protruding portion
35. third protruding portion
36. fourth protruding portion
37. first longitudinal limiting part
38. second longitudinal limiting part
39. connecting column
4. first yoke
41. first yoke part
42. second yoke part
5. second yoke
51. third yoke part
52. fourth yoke part
100. first glue dispensing port
200. second glue dispensing port
S. receiving chamber
X. transverse direction
Y. longitudinal direction

DETAILED DESCRIPTION

Now, the exemplary implementations will be described with reference to the accompanying drawings. However, the exemplary implementations can be implemented in various forms and should not be construed as limiting the implementations as set forth herein. Instead, these implementations are provided so that the present disclosure will be thorough and complete, and concept of the exemplary implementation will be fully conveyed to a skilled person in the art. Same reference numbers denote the same or similar structures in the figures, and thus the detailed description thereof will be omitted.

Figure 2:
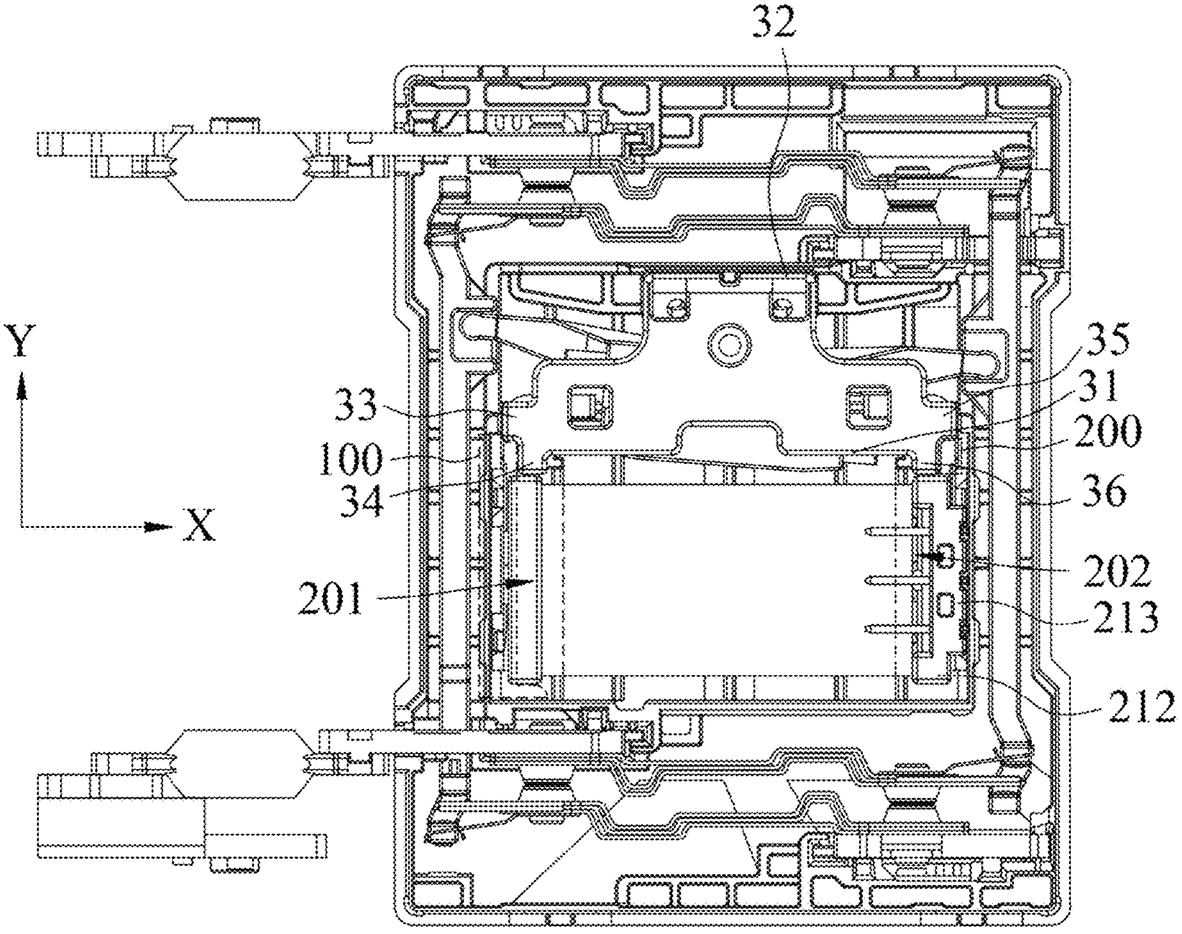
FIG. 2 is a top view of the magnetic latching relay according to some embodiments of the present disclosure as shown in FIG. 1.

As shown in FIG. 1 and FIG. 2, the embodiments of the present disclosure provide a magnetic latching relay including a base 1, a coil assembly 2, and a fixing frame 3.

Figure 4:
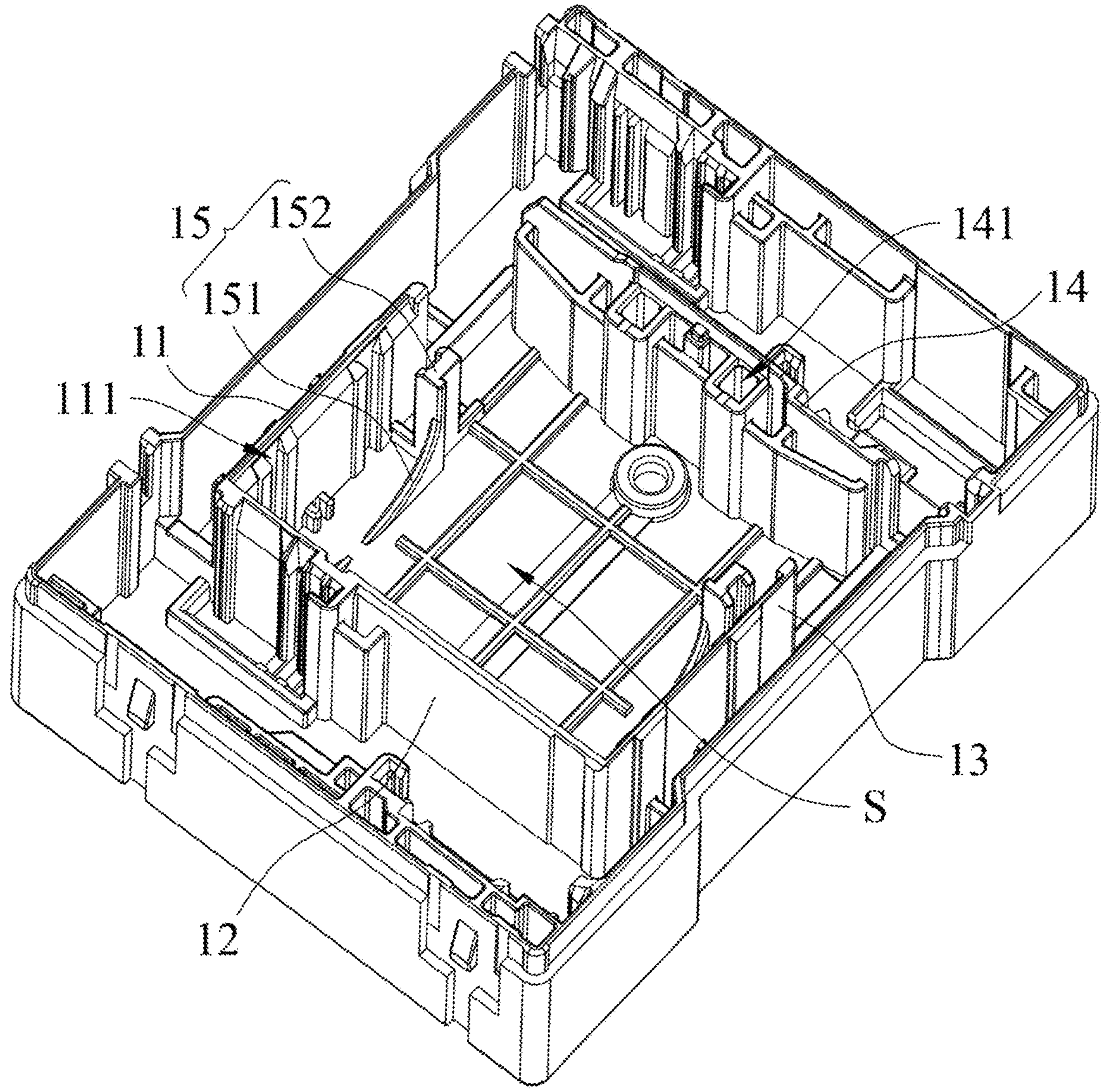
FIG. 4 is a perspective view of a base according to some embodiments of the present disclosure.
Figure 5:
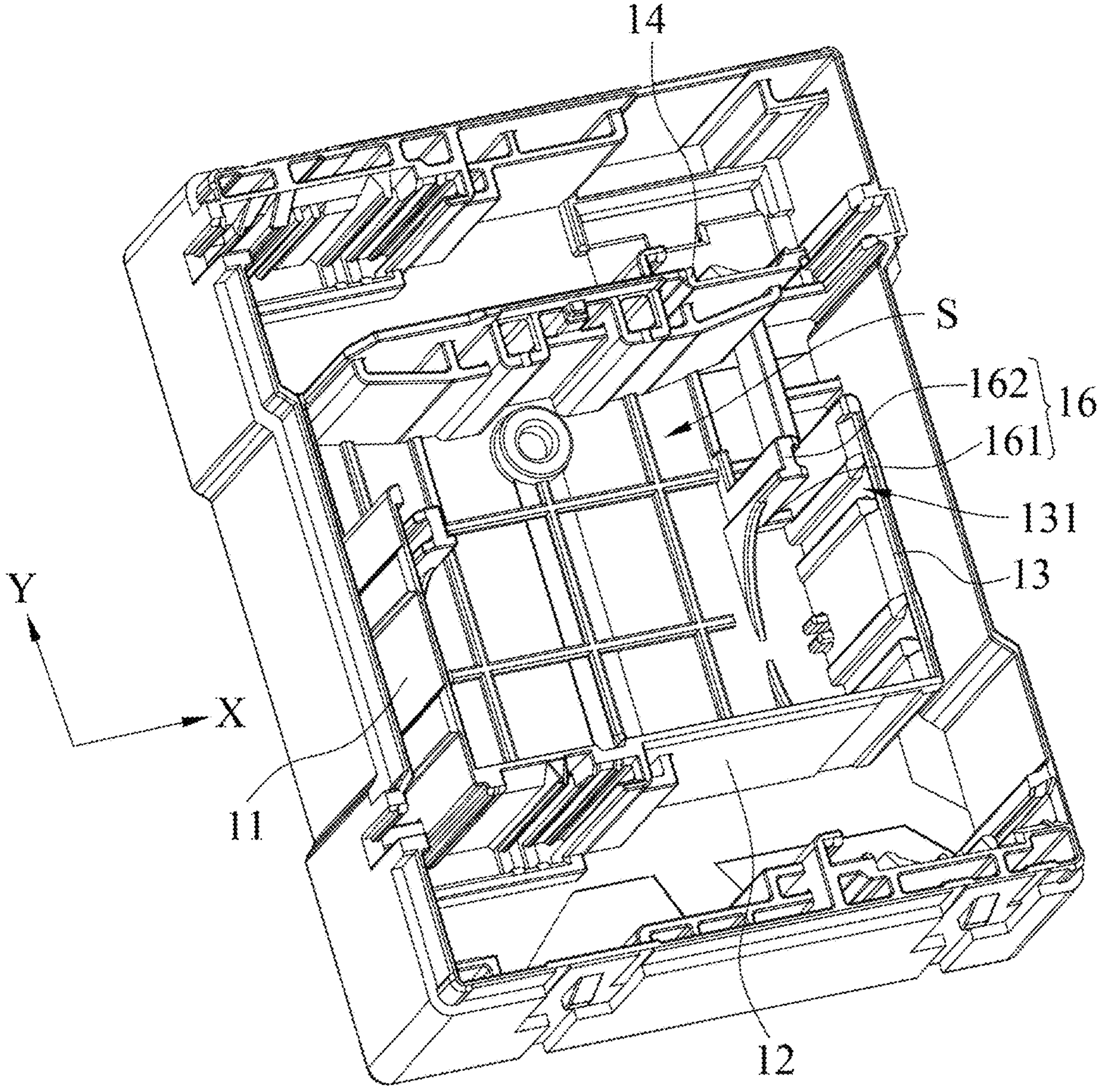
FIG. 5 is another perspective view of a base according to some embodiments of the present disclosure.
Figure 6:
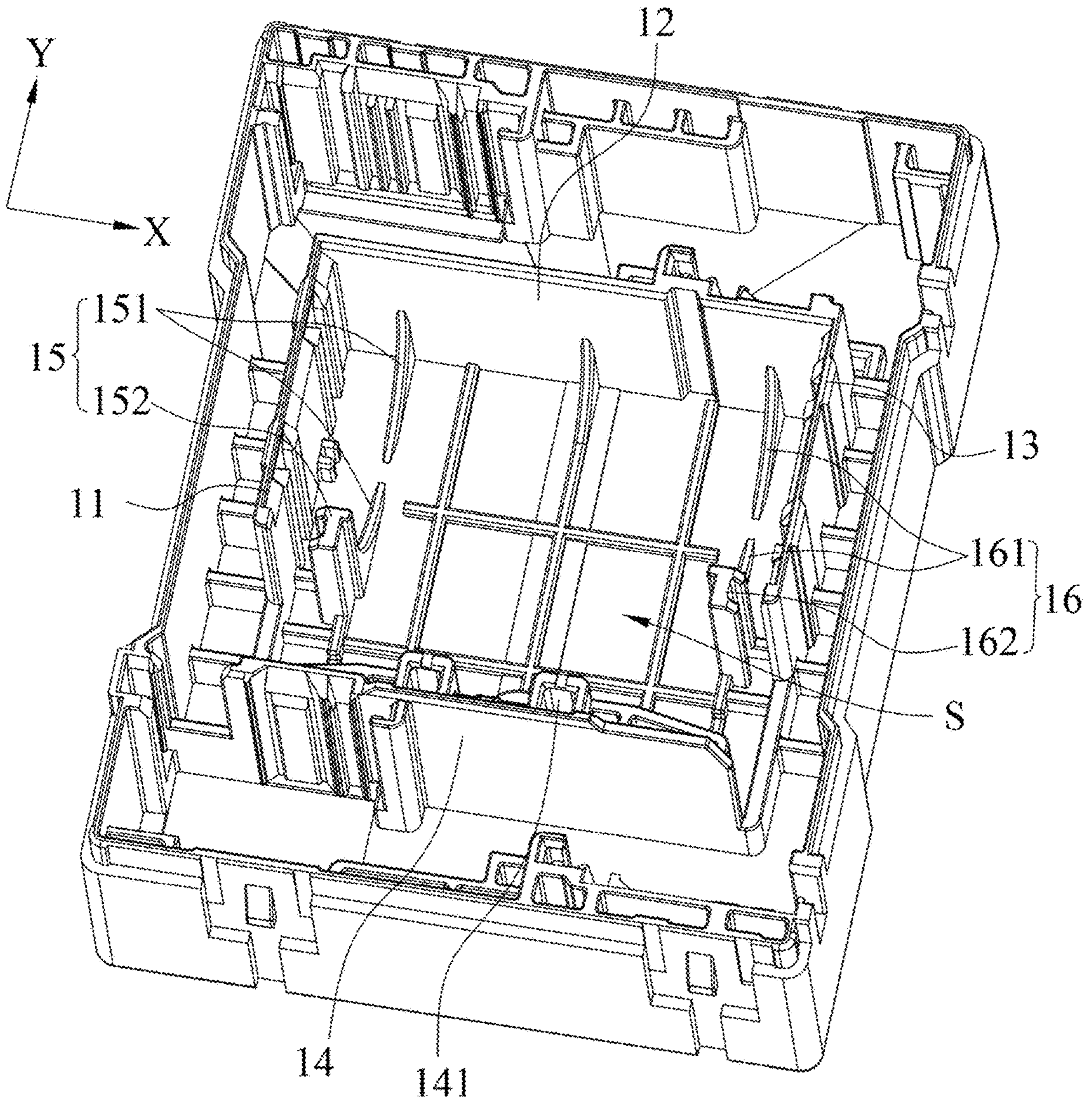
FIG. 6 is another perspective view of a base according to some embodiments of the present disclosure.

As shown in FIG. 4 to FIG. 6, the base 1 has a receiving chamber S, which is sequentially connected to a first sidewall 11, a second sidewall 12, and a third sidewall 13. The first sidewall 11 and the third sidewall 13 are oppositely arranged and respectively extend in a longitudinal direction Y, and the second sidewall 12 extends in a transverse direction X.

Specifically, as shown in FIG. 4, the first sidewall 11, the second sidewall 12, and the third sidewall 13 may be integrally formed through an injection molding process. The first sidewall 11 has a first free end, and the third sidewall 13 has a second free end. The base 1 may also include a fourth sidewall 14 that is arranged opposite to the second sidewall 12 and has a certain distance from the first free end of the first sidewall 11 and the second free end of the third sidewall 13, so that a first opening is formed between the first free end of the first sidewall 11 and the fourth sidewall 14, and a second opening is formed between the second free end of the third sidewall 13 and the fourth sidewall 14, that is, the receiving chamber S has two openings on both sides thereof.

It should be noted that "longitudinal direction Y" and "transverse direction X" in the present embodiment are technical terms for expressing directions, and in the embodiments of the present disclosure, a direction in which the second sidewall 12 extends is defined as the transverse direction X, while a direction in which the first sidewall 11 and the third sidewall 13 extend is defined as the longitudinal direction Y. These two technical terms are merely for the convenience of description and do not have a limiting significance.

As shown in FIG. 2, the coil assembly 2 includes a first end 201 and a second end 202 opposite to each other, the first end 201 is adjacent to the first sidewall 11; the coil assembly 2 is arranged in the receiving chamber S in the transverse direction X, with a gap between the first end 201 and the first sidewall 11.

As shown in FIG. 1 and FIG. 2, the fixing frame 3 is arranged on the base 1, on a side of the coil assembly 2 away from the second sidewall 12. The fixing frame 3 has a first side 31 close to the coil assembly 2 in the longitudinal direction Y. The first side 31 is in sealed contact with the first end 201 of the coil assembly 2, specifically, the first side 31 is in sealed contact with the first flange 211 of the first end 201, the side of the fixing frame 3 facing the first sidewall 11 is in sealed contact with the first sidewall 11, in this way, a first glue dispensing port 100 surrounded by the first sidewall 11, the second sidewall 12, the first end 201 of the coil assembly 2, and the fixing frame 3 is formed.

In some embodiments, the first flange 211 of the first end 201 of the coil assembly 2 may be in sealed contact with the second sidewall 12, in this way, the first glue dispensing port 100 is a closed glue dispensing port.

In some embodiments, as shown in FIG. 4 and FIG. 6, the magnetic latching relay further includes a first mounting bracket 15 that is arranged in the receiving chamber S of the base 1 and extends in the longitudinal direction Y. The first mounting bracket 15 is spaced from the first sidewall 11, the first end 201 of the coil assembly 2 is arranged on the first mounting bracket 15, and one end of the first mounting bracket 15 is in sealed connection with the second sidewall 12, in this way, a closed first glue dispensing port surrounded by the first sidewall 11, the second sidewall 12, the first mounting bracket 15, the first end 201 of the coil assembly 2, and the fixing frame 3 is formed.

As shown in FIG. 4 and FIG. 6, the first mounting bracket 15 has a first arcuate support 151, the first end 201 of the coil assembly 2 is arranged on the first arcuate support 151 with an arcuate surface, and the first end 201 of the coil assembly 2 is positioned on the arcuate surface. As shown in FIG. 6, one end of the first arcuate support 151 is in sealed connection with the second sidewall 12.

Specifically, as shown in FIG. 6, the first arcuate support 151 of the first mounting bracket 15 includes two sections of the arcuate supports that are opposite to each other in the longitudinal direction Y, the surface of the arcuate support is the arcuate surface. A curvature of the arcuate surface may be equal to or greater than a curvature of a coil 22 of the coil assembly 2, so that the arcuate surface may conform to the surface of the coil 22 for support.

In some embodiments, as shown in FIG. 1, the coil assembly 2 includes a bobbin 21 and a coil 22, the bobbin 21 includes a hollow cylindrical body and a first flange 211 that protrude radially at both ends of the body, and the coil 22 wound around the outer surface of the body. Here, as shown in FIG. 2, the first end 201 of the coil assembly 2 may be understood as a first end portion, which includes the coil 22 (i.e., straight lines as enclosed by dashed lines in FIG. 2) supported by the arcuate surface of the first arcuate support 151 and the first flange 211 at the first end 201, i.e., the portion from the first flange 211 to the dashed lines represents the first end 201. When the coil assembly 2 is arranged on the first mounting bracket 15, the first flange 211 of the first end 201 is arranged between the first sidewall 11 and the first mounting bracket 15, and there is still a first distance between the first flange 211 of the first end 201 and the first sidewall 11.

In some embodiments, as shown in FIG. 6, one end of the first arcuate support 151 is in sealed connection with the second sidewall 12, wherein the one end of first arcuate support 151 refers to one end of the first arcuate support 151 that is closer to the second sidewall 12 in the longitudinal direction Y. The one end of the first arcuate support 151 is in sealed connection with the second sidewall 12, it is possible that the first arcuate support 151 and the second sidewall 12 are formed by integrally injection molding or the one end of the first arcuate support 151 is in sealed connection with the second sidewall 12 by bonding, without any special limitation herein. Since one end of the first arcuate support 151 is in sealed connection with the second sidewall 12, when glue is dispensed between the first end 201 of the coil assembly 2 and the first sidewall 11, the first arcuate support 151 acts as a barrier to flowing of the glue, preventing it from flowing into other areas of the relay.

In some embodiments, as shown in FIG. 4 and FIG. 6, the first mounting bracket 15 also has a first limiting part 152 that is in sealed connection with the other end of the first arcuate support 151 and is spaced from the first sidewall 11.

As shown in FIG. 4 and FIG. 6, the other end of the first arcuate support 151 refers to one end that is opposite to the end of the first arcuate support 151 in the longitudinal direction Y. The first limiting part 152 is in sealed connection with the other end. In some embodiments, the first limiting part 152 and the other end of the first arcuate support 151 are integrally formed by injection molding, or the first limiting part 152 is in sealed connection with the other end of the first arcuate support 151 by bonding. In some embodiments, the first limiting part 152 is spaced from the first sidewall 11 and has a height equal to the first sidewall 11. Due to the arrangement of the first limiting part 152, when the first end 201 of the coil assembly 2 is arranged on the first arcuate support 151, the first limiting part 152 and the second sidewall 12 are used to limit on both sides of the coil assembly 2, preventing it from swaying in the longitudinal direction Y and ensuring the stability of the coil assembly 2. At the same time, the first limiting part 152 also serves to reinforce the first arcuate support 151, thereby prolonging service life of the first arcuate support 151.

In some embodiments, a first protruding portion 33 is arranged on one side of the fixing frame 3 facing the first sidewall 11 and protrudes towards the first sidewall 11, and the first protruding portion 33 is in sealed contact with the first sidewall 11.

Figure 7:
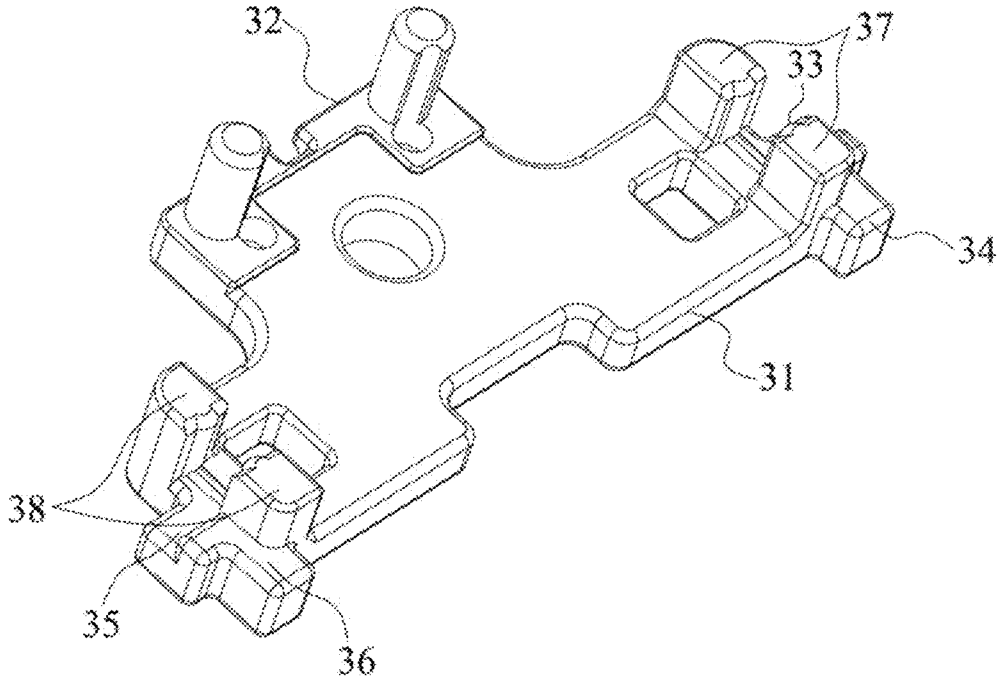
FIG. 7 is a perspective view of a fixing frame according to some embodiments of the present disclosure.

As shown in FIG. 2, the first side 31 of the fixing frame 3 is a side of the two sides of the fixing frame 3 distributed in the Longitudinal direction Y, close to the coil assembly 2. The first side 31 is in sealed contact with the side surface of the first flange 211 of the coil assembly 2. The fixing frame 3 has a second side 32 opposite to the first side 31. There is a connecting column 39 towards the base 1 (as shown in FIG. 7) on the second side 32 of the fixing frame 3. As shown in FIG. 3 to FIG. 6, there is a mounting hole 141 corresponding to the connecting column 39 on the fourth sidewall 14. By inserting the connecting column 39 into the corresponding mounting hole 141, the fixing frame 3 is arranged on the base 1. As shown in FIG. 2, a first glue dispensing port 100 surrounded by the fixing frame 3, the first sidewall 11, the second sidewall 12, the first arcuate support 151 of the first mounting bracket 15, and the first flange 211 of the first end 201 of the coil assembly 2 is formed, and the first glue dispensing port 100 is closed (as enclosed by the dashed lines in FIG. 2). Below the first glue dispensing port 100, there is a first glue dispensing slot formed by the first sidewall 11, the second sidewall 12, the first arcuate support 151 of the first mounting bracket 15, the first flange 211 of the first end 201 of the coil assembly 2, and the first limiting part 152, and the first glue dispensing slot is not closed but has gaps.

During a dispensing of glue, the glue can be relatively thick and can have low fluidity. When dispensing the glue in the first glue dispensing port 100, it can be ensured that the glue does not spill over due to a closed inner profile of the first glue dispensing port 100. As the glue flows downward slowly, the gaps in the first glue dispensing slot can facilitate the expulsion of air from the glue, and improve a bonding effect of the glue. It should be noted that due to the high viscosity and the low fluidity of the glue, and the glue dispensing range in the first glue dispensing port 100 is determined, even if the first glue dispensing slot is not closed, the glue will adhere to the corresponding components after entering the first glue dispensing slot and will not spill over to other areas.

In some embodiments, as shown in FIG. 2, a second protruding portion 34 that protrudes towards the first end 201 of the coil assembly 2 is arranged on the first side 31 of the fixing frame 3, and the second protruding portion 34 is in sealed contact with the first end 201 of the coil assembly 2 and the other end of the first mounting bracket 15, respectively.

Specifically, as shown in FIG. 2, the second protruding portion 34 protrudes towards a direction close to the coil assembly 2 with respect to the first side 31 and abuts against one side of the first flange 211 on the first end 201 of the coil assembly 2, and the bottom surface of the second protruding portion 34 (the surface facing one side of the base 1) covers the first limiting part 152 of the first mounting bracket 15. Therefore, the first limiting part 152 is in sealed contact with the fixing frame 3, and during the oven curing process after dispensing, even if the fluidity of the adhesive increases, it will not flow through the first mounting bracket 15 to other areas.

Figure 3:
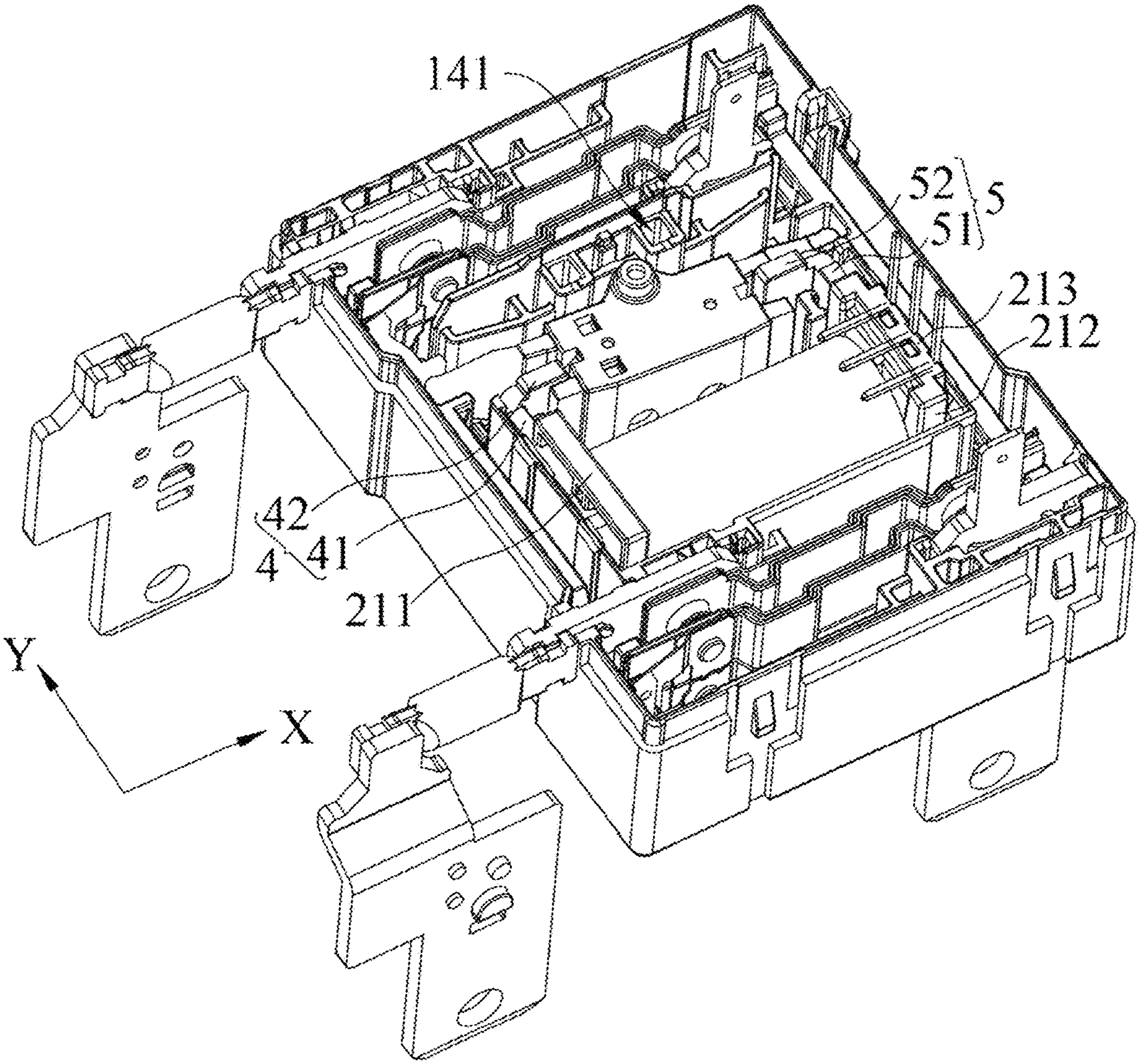
FIG. 3 is a perspective view of the magnetic latching relay according to some embodiments of the present disclosure, with the fixing frame removed.

In some embodiments, as shown in FIG. 3, the magnetic latching relay further includes a first yoke 4, which includes a first yoke part 41 and a second yoke part 42 connected in an L-shape. The first yoke part 41 is arranged between the first end 201 of the coil assembly 2 and the first sidewall 11 and is fixed to the first sidewall 11. The second yoke part 42 faces the fixing frame 3. As shown in FIG. 7, the fixing frame 3 includes a first longitudinal limiting part 37 that clamps to the second yoke part 42 in the longitudinal direction Y.

As shown in FIG. 3, the first yoke part 41 of the first yoke 4 is arranged in the distance between the first end 201 of the coil assembly 2 and the first sidewall 11 and is fixed to the first sidewall 11. As shown in FIG. 4, there is a first slot 111 on the first sidewall 11, and the first yoke part 41 has a first protrusion (not shown) that engages with the first slot 111, to allow the first protrusion clamped in the first slot 111, so as to fix the first yoke part 41 to the first sidewall 11. Since the first yoke part 41 occupies a space between the first sidewall 11 and the first end 201 of the coil assembly 2, after dispensing the glue, the glue will flow downward along the first yoke part 41, the first sidewall 11, the second sidewall 12, the first end 201 of the coil assembly 2, and the first mounting bracket 15 within the first glue dispensing port 100. Due to the high viscosity of the glue, it will not spill over, and there is the gap between the aforementioned components, it facilitates expelling the air from the glue, to make the bonding of the components such as the yoke 4 more secure. After dispensing the glue, when it is placed in the oven for curing, the viscosity of the glue will decrease and its fluidity will increase as the temperature rises, allowing the glue to flow fully into all the components within the first glue dispensing slot and further expelling the air from the glue to make the bonding of the components more secure. Since the gap between the aforementioned components is small, the resulting glue area is large, which can prevent the glue from spilling over.

As shown in FIG. 3, the second yoke part 42 is bent towards the direction close to the third sidewall 13. The first longitudinal limiting part 37 of the fixing frame 3 clamps to the second yoke part 42, which can prevent the fixing frame 3 from being directly plugged into the base 1, i.e., prevent the arrangement for corresponding installation holes on the base 1, to simplify the structure of the base 1 and allow the fixing frame 3 to be installed quickly and accurately.

In some embodiments, as shown in FIG. 2, the second end 202 of the coil assembly 2 is adjacent to the third sidewall 13, and the first side 31 of the fixing frame 3 is in sealed contact with the second end 202 of the coil assembly 2.

As shown in FIG. 2, the second end 202 of the coil assembly 2 may be interpreted as a second end portion, which includes a coil 22 partially wound on a main body of the bobbin 21 (as shown in the straight lines enclosed by the dashed lines in FIG. 2) and a second flange 212 of the bobbin 21 at the second end 202. Herein, a second distance between the second end 202 of the coil assembly 2 and the third sidewall 13 is a distance between the second flange 212 of the second end 202 and the third sidewall 13. The first side 31 of the fixing frame 3 abuts against the side surface of the second flange 212 of the coil assembly 2, so that the first side 31 of the fixing frame 3 is sealed contact with the second end 202 of the coil assembly 2.

In some embodiments, as shown in FIG. 1 and FIG. 2, The top of the second end 202 of the coil component 2 has a protruding edge 213 that protrudes towards the third sidewall 13, and the protruding edge 213 is in sealing contact with the top of the third sidewall 13.

As shown in FIG. 1 and FIG. 2, the protruding edge 213 protrudes from the top of the second flange 212 at the second end 202 of the coil component 2 towards the third sidewall 13. That is, the protruding edge 213 is a protruding portion at the top of the second flange 212, there is a distance between the second flange 212 and the third sidewall 13 under the protruding edge 213. The protruding edge 213 is used for connecting terminals, as shown in FIG. 1, three connecting terminals are arranged on the protruding edge 213. The protruding edge 213 may abut against the top of the third sidewall 13, so that the protruding edge 213 is in sealed contact with the top of the third sidewall 13.

In some embodiments, as shown in FIG. 1 and FIG. 2, the fixing frame 3 has a third protruding portion 35 that protrudes towards the third sidewall 13, and the third protruding portion 35 is in sealed contact with the third sidewall 13, in this way, a closed second glue dispensing port 200 surrounded by the third sidewall 13, the second end 202 of the coil assembly 2, and the fixing frame 3 is formed.

Specifically, as shown in FIG. 1 and FIG. 2, the fixing frame 3 has a third protruding portion 35 that protrudes towards the third sidewall 13, and the third protruding portion 35 is in sealed contact with the third sidewall 13, for example, the third protruding portion 35 abuts against the second free end of the third sidewall 13. As shown in FIG. 2, a second glue dispensing port 200 surrounded by the third sidewall 13, the protruding edge 213 of the second end 202 of the coil assembly 2, the first flange 211, and the fixing frame 3 is formed, and the second glue dispensing port 200 is closed (as enclosed by the dashed lines in FIG. 2). When dispensing the glue, the glue is relatively thick and has low fluidity, and as dispensing the glue in the closed second glue dispensing port 200, it is ensured that the glue does not spill over due to the closed profile of the second glue dispensing port 200.

In some embodiments, as shown in FIG. 1 and FIG. 2, the first side 31 of the fixing frame 3 has a fourth protruding portion 36 that protrudes towards the coil assembly 2, and the fourth protruding portion 36 is in sealed contact with the second end 202 of the coil assembly 2.

As shown in FIG. 1 and FIG. 2, the fourth protruding portion 36 protrudes towards the coil assembly 2 with respect to the first side 31 of the fixing frame 3 and abuts against one side of the second flange 212 of the second end 202 of the coil assembly 2, so that the fourth protruding portion 36 is in sealed contact with the second end 202 of the coil assembly 2.

In some embodiments, as shown in FIG. 4 to FIG. 6, the base 1 further has a second mounting bracket 16 that extends in the longitudinal direction Y, the second mounting bracket 16 is arranged in the receiving chamber S and is spaced from the third sidewall 13 in the transverse direction X, one end of the second mounting bracket 16 is in sealed connection with the second sidewall 12, and the second end 202 of the coil assembly 2 is arranged on the second mounting bracket 16.

In some embodiments, as shown in FIG. 6, the second mounting bracket 16 has a second arcuate support 161 with an arcuate surface, the second end 202 of the coil assembly 2 is arranged on the arcuate surface, and one end of the second arcuate support 161 is in sealed connection with the second sidewall 12.

Specifically, as shown in FIG. 5 and FIG. 6, the second mounting bracket 16 has a second arcuate support 161 that includes two sections of the arcuate support portions, which are opposite to each other in the longitudinal direction Y, the surfaces of the arcuate support sections are arcuate surfaces. A curvature of the arcuate surface may be equal to or greater than a curvature of the coil 22 of the coil assembly 2, so that the arcuate surface may conform to the surface of the coil 22 for support. Therefore, the second end 202 of the coil assembly 2 includes the coil 22 supported by the arcuate surface of the second arcuate support 161, the coil 22 is wound on the bobbin 21 (as shown by the straight lines enclosed by the dashed lines in FIG. 2) and the second flange 212 of the second end 202, that is, the second end 202 is the portion from the second flange 212 to the dashed lines on the coil 22. When the coil assembly 2 is arranged on the second mounting bracket 16, the second flange 212 of the second end 202 of the coil assembly 2 is arranged between the first sidewall 11 and the second mounting bracket 16, and there is still a second gap between the first flange 211 of the second end 202 and the third sidewall 13.

As shown in FIG. 6, one end of the second mounting bracket 16 is in sealed connection with the second sidewall 12. Herein, one end of the second mounting bracket 16 refers to one of the second arcuate support 161 that is closer to the second sidewall 12 in the longitudinal direction Y. The second arcuate support 161 may be integrally injection molded with the second sidewall 12, or one end of the second arcuate support 161 is in sealed connection with the second sidewall 12 by bonding, without any special limitation herein. Since one end of the second arcuate support 161 is in sealed connection with the second sidewall 12, when dispensing the glue into the second glue dispensing port 200, the second arcuate support 161 acts as a barrier to the flowing of the glue, to prevent it from flowing into other areas of the relay.

In some embodiments, as shown in FIG. 5, the second arcuate support 161 further has a second limiting part 162, which is in sealed connection with the other end of the second arcuate support 161 and is spaced from the third sidewall 13 in the transverse direction X. The second limiting part 162 may have the same structure and function with the first limiting part 152, which is not described in detail herein.

In some embodiments, the bottom surface (the surface facing one side of the base 1) of the fourth protruding portion 36 of the fixing frame 3 covers the second limiting part 162. Therefore, the second limiting part 162 is in sealed contact with the fixing frame 3, and during the oven curing process after dispensing, even if the fluidity of the adhesive increases, it will not flow through the second mounting bracket 16 to other areas.

Through the above arrangement, under the second glue dispensing port 200, there is a second glue dispensing slot formed by the third sidewall 13, the second sidewall 12, the second arcuate support 161 of the second mounting bracket 16, the second end 202 of the coil assembly 2, and the second limiting part 162. The second glue dispensing slot is not closed but has a gap.

During dispensing the glue, the glue is relatively thick, and when the glue is dripped from the second glue dispensing port 200, it flows downward slowly. Since the second glue dispensing slot has the gap, it facilitates expelling the air from the glue, and improving the bonding effect of the glue. Due to the high viscosity and low fluidity of the glue, and after dispensing the glue through the second glue dispensing port 200, even if the second glue dispensing slot is not closed, the glue will adhere to the corresponding components after entering the second glue dispensing slot and will not spill over to other areas to make the bonding of the components more secure.

In some embodiments, as shown in FIG. 3, the magnetic latching relay further includes a second yoke 5, which includes a third yoke part 51 and a fourth yoke part 52 connected in an L-shape. The third yoke part 51 is arranged between the second end 202 of the coil assembly 2 and the third sidewall 13 and is fixed to the third sidewall 13. The fourth yoke part 52 faces the fixing frame 3. As shown in FIG. 7, the fixing frame 3 includes a second longitudinal limiting part 38 that clamps to the fourth yoke part 52 in the longitudinal direction Y.

As shown in FIG. 3, the third yoke part 51 of the second yoke 5 is arranged in the second distance between the second end 202 of the coil assembly 2 and the third sidewall 13 and is fixed to the third sidewall 13. As shown in FIG. 5, there is a second slot 131 on the third sidewall 13, and the third yoke part 51 has a second protrusion (not shown) that engages with the second slot 131, and the second protrusion is clamped in the second slot 131, so that the third yoke part 51 is fixed to the third sidewall 13. Since the third yoke part 51 occupies a space between the third sidewall 13 and the second end 202 of the coil assembly 2, after dispensing the glue, the glue will flow downward along the third yoke part 51, the third sidewall 13, the second sidewall 12, the second end 202 of the coil assembly 2, and the second mounting bracket 16 within the second glue dispensing port 200. Due to the high viscosity of the glue, it will not spill over, and there is the gap between the aforementioned components, it facilitates expelling the air from the glue, to make the bonding of the components such as the yoke more secure. After dispensing the glue, when it is placed in the oven for curing, the viscosity of the glue will decrease and its fluidity will increase as the temperature rises, allowing the glue to flow fully into all the components within the first glue dispensing slot and further expelling the air from the glue to make the bonding of the components more secure. Since the gap between the aforementioned components is small, the resulting glue area is large, which can prevent the glue from spilling over.

As shown in FIG. 3, the fourth yoke part 52 is bent towards the direction close to the first sidewall 11. The second longitudinal limiting part 38 of the fixing frame 3 clamps to the fourth yoke part 52, which can prevent the fixing frame 3 from being directly plugged into the base 1, simplify the structure of the base 1, and allow the fixing frame 3 to be installed quickly and accurately.

It can be understood that the various examples/embodiments provided by the present disclosure can be combined with each other without contradiction, and detailed examples are not provided herein.

In the embodiments of the present disclosure, the terms "first", "second", "third" are used for descriptive purposes only and should not be understood as indicating or implying relative importance; the term "a plurality of" refers to two or more, unless there is a clear definition otherwise. The terms such as "installation", "connected", "connection", "fixed" should be understood in a broad sense. For example, "connection" can be a fixed connection, or a removable connection, or an integral connection; "connected" can be directly connected, or indirectly connected through an intermediary medium. For the ordinary skilled person in the art, the specific meanings of these terms in the embodiments of the invention can be understood based on the specific circumstances.

In the description of the embodiments of the present disclosure, it should be understood that the terms "upper", "lower", "left", "right", "front", and "rear" indicate a direction or position based on the orientation or position shown in the accompanying drawings. These terms are used only to facilitate the description of the embodiment and to simplify the description, and are not intended to indicate or imply that the device or unit referred to must have a specific direction, be constructed and operated in a specific orientation. Therefore, these terms should not be construed as limiting the embodiments of the invention.

In the description of this specification, terms such as "an embodiment," "some embodiments," "a specific embodiment" refer to the specific features, structures, materials, or characteristics described in conjunction with the embodiment or example being included in at least one embodiment or example of the invention. In this specification, the illustrative terms do not necessarily refer to the same embodiment or example. Moreover, the specific features, structures, materials, or characteristics described may be suitably combined in any one or more of the embodiments or examples.

The above description is merely a preferred embodiment of the present disclosure and is not intended to limit the embodiment. For the person skilled in the art, the present disclosure may be subject to various changes and modifications. Any modifications, equivalent substitutions, improvements, and the like made within the spirit and principles of the embodiments of the present disclosure should be included within the scope of protection of the embodiments of the present disclosure.

What is claimed is:

1. A magnetic latching relay, comprising:
- a base, with a receiving chamber, the receiving chamber having a first sidewall extending in a longitudinal direction and a second sidewall extending in a transverse direction, the first sidewall and the second sidewall being connected;
- a coil assembly, arranged in the receiving chamber in the transverse direction, and the coil assembly having a first end adjacent to the first sidewall;
- a fixing frame, arranged on the base and located on a side of the coil assembly away from the second sidewall, the fixing frame having a first side close to the coil assembly in the longitudinal direction, the first side being in sealed contact with a first end of the coil assembly, and a side of the fixing frame facing the first sidewall being in sealed contact with the first sidewall, thereby forming a first glue dispensing port surrounded by the first sidewall, the second sidewall, the first end of the coil assembly, and the fixing frame.

2. The magnetic latching relay according to claim 1, further comprising:
- a first mounting bracket, arranged in the receiving chamber of the base and extending in the longitudinal direction, the first mounting bracket being spaced from the first sidewall, the first end of the coil assembly being arranged on the first mounting bracket, and one end of the first mounting bracket being in sealed connection with the second sidewall, thereby forming a closed first glue dispensing port surrounded by the first sidewall, the second sidewall, the first mounting bracket, the first end of the coil assembly, and the fixing frame.

3. The magnetic latching relay according to claim 2, wherein the side of the fixing frame facing the first sidewall has a first protruding portion protruding towards the first sidewall, the first protruding portion is in sealed contact with the first sidewall, and the first side of the fixing frame has a second protruding portion protruding towards the first end of the coil assembly, the second protruding portion is in sealed contact with the first end of the coil assembly and the other end of the first mounting bracket.

4. The magnetic latching relay according to claim 3, wherein the coil assembly further comprises a second end opposite to the first end, the receiving chamber further has a third sidewall extending in the longitudinal direction, the third sidewall is connected with the second sidewall and being arranged opposite to the first sidewall, the second end of the coil assembly is adjacent to the third sidewall, and the first side of the fixing frame is in sealed contact with the second end of the coil assembly.

5. The magnetic latching relay according to claim 2, wherein the first mounting bracket has a first arcuate support with an arcuate surface, the first end of the coil assembly is located on the arcuate surface, and one end of the first arcuate support is in sealed connection with the second sidewall.

6. The magnetic latching relay according to claim 5, wherein the first mounting bracket further has a first limiting part that is in sealed connection with the other end of the first arcuate support and is spaced from the first sidewall.

7. The magnetic latching relay according to claim 6, wherein the coil assembly further comprises a second end opposite to the first end, the receiving chamber further has a third sidewall extending in the longitudinal direction, the third sidewall is connected with the second sidewall and being arranged opposite to the first sidewall, the second end of the coil assembly is adjacent to the third sidewall, and the first side of the fixing frame is in sealed contact with the second end of the coil assembly.

8. The magnetic latching relay according to claim 5, wherein the coil assembly further comprises a second end opposite to the first end, the receiving chamber further has a third sidewall extending in the longitudinal direction, the third sidewall is connected with the second sidewall and being arranged opposite to the first sidewall, the second end of the coil assembly is adjacent to the third sidewall, and the first side of the fixing frame is in sealed contact with the second end of the coil assembly.

9. The magnetic latching relay according to claim 2, wherein the coil assembly further comprises a second end opposite to the first end, the receiving chamber further has a third sidewall extending in the longitudinal direction, the third sidewall is connected with the second sidewall and being arranged opposite to the first sidewall, the second end of the coil assembly is adjacent to the third sidewall, and the first side of the fixing frame is in sealed contact with the second end of the coil assembly.

10. The magnetic latching relay according to claim 1, further comprising:

a first yoke, comprising a first yoke part and a second yoke part, the first yoke part and the second yoke part being connected in an L-shape, the first yoke part being located between the first end of the coil assembly and the first sidewall and being fixedly arranged on the first sidewall, the second yoke part facing the fixing frame, the fixing frame comprising a first longitudinal limiting part, the first longitudinal limiting part being clamped to the second yoke part in a longitudinal direction.

11. The magnetic latching relay according to claim 10, wherein the coil assembly further comprises a second end opposite to the first end, the receiving chamber further has a third sidewall extending in the longitudinal direction, the third sidewall is connected with the second sidewall and being arranged opposite to the first sidewall, the second end of the coil assembly is adjacent to the third sidewall, and the first side of the fixing frame is in sealed contact with the second end of the coil assembly.

12. The magnetic latching relay according to claim 1, wherein the coil assembly further comprises a second end opposite to the first end, the receiving chamber further has a third sidewall extending in the longitudinal direction, the third sidewall is connected with the second sidewall and being arranged opposite to the first sidewall, the second end of the coil assembly is adjacent to the third sidewall, and the first side of the fixing frame is in sealed contact with the second end of the coil assembly.

13. The magnetic latching relay according to claim 12, wherein a top of the second end of the coil assembly has a flange protruding towards the third sidewall, the flange is in sealed contact with the top of the third sidewall.

14. The magnetic latching relay according to claim 13, wherein the fixing frame has a third protruding portion protruding towards the third sidewall, the third protruding portion is in sealed contact with the third sidewall, thereby forming a closed second glue dispensing port surrounded by the third sidewall, the second end of the coil assembly, and the fixing frame.

15. The magnetic latching relay according to claim 12, wherein the first side of the fixing frame has a fourth protruding portion protruding towards the coil assembly, and the fourth protruding portion is in sealed contact with the second end of the coil assembly.

16. The magnetic latching relay according to claim 12, wherein the base further has a second mounting bracket extending in the longitudinal direction, the second mounting bracket is arranged in the receiving chamber and is spaced from the third sidewall, one end of the second mounting bracket is in sealed connection with the second sidewall, and the second end of the coil assembly is arranged on the second mounting bracket.

17. The magnetic latching relay according to claim 16, wherein the second mounting bracket has a second arcuate support with an arcuate surface, the second end of the coil assembly is located on the arcuate surface, and one end of the second arcuate support is in sealed connection with the second sidewall.

18. The magnetic latching relay according to claim 12, further comprising:

a second yoke, comprising a third yoke part and a fourth yoke part, the third yoke part and the fourth yoke part being connected in an L-shape, the third yoke part being arranged between the second end of the coil assembly and the third sidewall and being fixedly arranged on the third sidewall, the fourth yoke part facing the fixing frame, the fixing frame comprising a second longitudinal limiting part, the second longitudinal limiting part being clamped to the fourth yoke part in the longitudinal direction.

* * * * *